United States Patent
Le Toquin et al.

(10) Patent No.: US 12,517,962 B2
(45) Date of Patent: Jan. 6, 2026

(54) PROCESSING A SEARCH QUERY

(71) Applicant: AMADEUS S.A.S., Biot (FR)

(72) Inventors: Youri Le Toquin, Nice (FR); Paolo Iannino, Zurich (CH)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/541,471

(22) Filed: Dec. 15, 2023

(65) Prior Publication Data

US 2024/0202258 A1 Jun. 20, 2024

(30) Foreign Application Priority Data

Dec. 19, 2022 (EP) ..................................... 22315334

(51) Int. Cl.
  *G06F 16/00* (2019.01)
  *G06F 11/34* (2006.01)
  *G06F 16/9532* (2019.01)
  *G06F 16/957* (2019.01)
(52) U.S. Cl.
  CPC ...... *G06F 16/9532* (2019.01); *G06F 11/3409* (2013.01); *G06F 16/957* (2019.01)
(58) Field of Classification Search
  None
  See application file for complete search history.

(56) References Cited

U.S. PATENT DOCUMENTS

| | | | | |
|---|---|---|---|---|
| 10,169,711 B1 * | 1/2019 | Dean | ..................... | H04L 67/535 |
| 11,113,315 B2 * | 9/2021 | Glover | ................ | G06F 16/2448 |
| 11,157,488 B2 * | 10/2021 | Feuz | ...................... | G06N 20/00 |
| 2005/0262065 A1 * | 11/2005 | Barth | ...................... | G06F 16/00 |
| 2007/0233671 A1 * | 10/2007 | Oztekin | .............. | G06F 16/9535 |
| | | | | 707/999.005 |
| 2007/0239680 A1 * | 10/2007 | Oztekin | .............. | G06F 16/9535 |
| 2012/0066275 A1 * | 3/2012 | Gerstner | ................. | G06F 16/29 |
| | | | | 707/825 |
| 2012/0150850 A1 * | 6/2012 | Parthasarathy | ..... | G06F 16/9535 |
| | | | | 707/E17.014 |
| 2012/0203750 A1 * | 8/2012 | Vaananen | ......... | G06F 16/24578 |
| | | | | 707/706 |
| 2015/0242510 A1 * | 8/2015 | Shapira | ................... | H04L 67/10 |
| | | | | 707/706 |

(Continued)

FOREIGN PATENT DOCUMENTS

| | | | |
|---|---|---|---|
| CN | 114202061 A | * | 3/2022 |
| CN | 117150041 A | * | 12/2023 |
| WO | WO-2020060605 A1 | | 3/2020 |

*Primary Examiner* — Jean M Corrielus

(74) *Attorney, Agent, or Firm* — Perry + Currier Inc.

(57) ABSTRACT

A computerized method of processing a search query using reinforcement learning is presented. The method comprises receiving a search query, determining a state vector representing a current state of processing the search query based on at least one query parameter included in the search query, determining a search response to the search query according to at least one action determined by a policy network based on the state vector, the at least one action impacting an amount of resources to be utilized for determining the search response, determining a score based on the search response, the score defining a reward given for the search response, and updating the policy network according to the score.

10 Claims, 5 Drawing Sheets

(56) References Cited

U.S. PATENT DOCUMENTS

| | | | |
|---|---|---|---|
| 2016/0188173 A1* | 6/2016 | Glover | G06F 16/951 |
| | | | 707/706 |
| 2016/0188742 A1* | 6/2016 | Ingvoldstad | G06F 16/9562 |
| | | | 707/722 |
| 2018/0196866 A1* | 7/2018 | Standefer, V | G06F 16/14 |
| 2019/0171689 A1* | 6/2019 | Kachkach | G06F 16/9038 |
| 2019/0179827 A1* | 6/2019 | Andrianakou | G06F 16/24578 |
| 2019/0179938 A1* | 6/2019 | Feuz | G06N 3/08 |
| 2019/0332612 A1* | 10/2019 | Glover | G06Q 30/0623 |
| 2020/0341976 A1* | 10/2020 | Aggarwal | G06F 16/90332 |

* cited by examiner

PROCESSING A SEARCH QUERY

CROSS-REFERENCE TO RELATED APPLICATION(S)

This application claims the benefit of European Patent Application No. 22315334.7, filed Dec. 19, 2022, entitled "PROCESSING A SEARCH QUERY"; the entire contents of which are incorporated herein by reference.

FIELD

The present disclosure generally relates to data processing and, in particular, to methods and systems of processing a search query using reinforcement learning.

BACKGROUND

Search queries are one of the central technical concepts applied in distributed environments to retrieve data. Users search e.g. for products and services or client devices send search queries to provider servers to retrieve the information needed to, e.g., run an application or instantiate a connection. An example of such a search system is a search and/or booking system for travel products, such as airline flights. Incoming queries to such a system typically contain numerous input values, and responses to such queries are generated from source data that can be combined to produce a large number of possible responses.

Therefore, a large amount of the data transferred in a network is related to search queries. Moreover, the data transfer in networks increases year by year. Finally, the complexity of the search queries also raises as more data sources are available but the response times, in particular, for time-critical applications must be kept low. Hence, there is a steep increase in the computational requirements for processing search queries.

Therefore and—in view of energy consumption and natural resources required to provide computational resources—there is a need for processing a search query efficiently.

SUMMARY

In this context, methods, systems and computer program products are presented as defined by the independent claims.

More specifically, a computerized method of processing a search query using reinforcement learning is presented. The method comprises receiving a search query, determining a state vector representing a current state of processing the search query based on at least one query parameter included in the search query, determining a search response to the search query according to at least one action determined by a policy network based on the state vector, the at least one action impacting an amount of resources to be utilized for determining the search response, determining a score based on the search response, the score defining a reward given for the search response, and updating the policy network according to the score.

Another aspect concerns a computing device for processing a search query using reinforcement learning. The computing device is configured to receive a search query, to determine a state vector representing a current state of processing the search query based on at least one query parameter included in the search query, to determine a search response to the search query according to at least one action determined by a policy network based on the state vector, the at least one action impacting an amount of resources to be utilized for determining the search response, to determine a score based on the search response, the score defining a reward given for the search response, and to update the policy network according to the score implementing the methods as described herein. In embodiments, the computing device is configured to execute the methods as described herein.

Yet another aspect concerns a computing system for processing a search query. The computing system comprises a central server storing a master model of a neural network comprising a policy and a value network and at least two computing devices storing each a copy of the neural network. The at least two computing devices further execute the method as described herein independently. Moreover, the copies of the policy network and the value network are updated asynchronously by the central server based on scores and gradients determined at the at least two computing devices.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the disclosure not being limited to any particular embodiments.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements, in which.

DETAILED DESCRIPTION

The present disclosure relates to methods and systems of processing a search query. In particular, a search query is processed with the help of a reinforcement learning architecture. Reinforcement learning is one of the three big types of machine learning besides supervised and unsupervised learning. Reinforcement learning thereby focuses on how intelligent agents ought to take actions in an environment in order to maximize the notion of cumulative reward.

Reinforcement learning is applied in various technical areas of information technology such as data center management, e.g., for cooling, but is also applied for web searches, e.g., for ranking of results or spidering through data sources. Known state of the art search systems typically use a unique and common process for all queries. Hence, optimizations of determining search responses are usually tackled by pre- or postfiltering of the search responses. In some implementations, heuristic based approaches or machine learning is applied for such pre- or post-filtering processes but only rarely adaptive systems are known that can self-optimize the searches.

Processing of search queries in a reinforcement learning architecture is presented in this disclosure that applies selected actions for automatically and dynamically optimizing search responses to a search query. In some embodiments, the architecture allows for asynchronous updates to optimize and tailor the search processing while having no impact on the data flow and infrastructure already present for executing search queries. In some further embodiments, the architecture is further highly distributed to ensure the provision of sufficient computational resources and/or the search results in near real-time.

Figure 1:
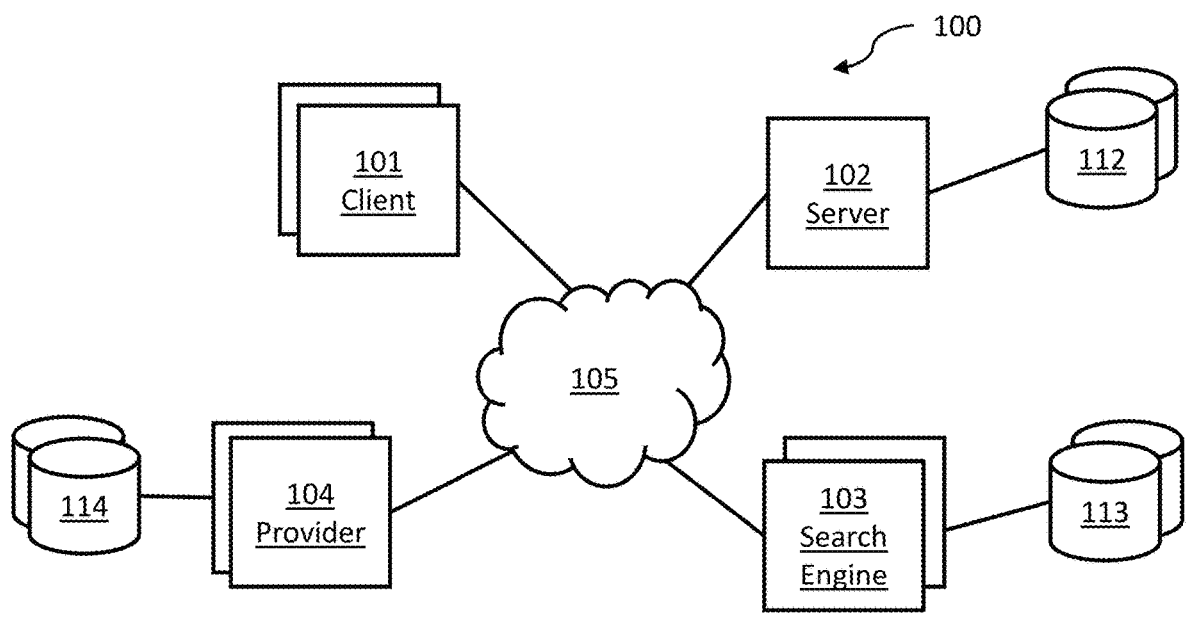
FIG. 1 depicts an example computing environment implementing the functionalities described herein.

FIG. 1 presents an example computing environment 100, in which the presented methods of processing a search query may be implemented. The computing environment 100 comprises one or more client devices 101, a server 102, one or more search engines 103, and one or more search result providers 104, which are connected with each other via a network 105. The network 105 may be a wide area network, global network, the Internet, or similar network, may be a public or a private network, and may include multiple interconnected networks as is known in the art.

The client devices 101 send out search queries to the search engine 103. The client devices 101 may be mobile devices, such as laptops, netbooks, tablets, mobile phones, and the like, or may be other computing systems, such as a personal computer, or another server, possibly similar to the server 102. The client devices 101 may also comprise at least one memory, such as a random-access memory (RAM), read-only memory (ROM), and the like, and various other components, such as a motherboard, a bus, a cooler, and the like.

A search query may be initiated by a user of a client device 101, e.g., via an application or via the browser stored on the client device 101 and sent via the network 105 to the server 102. Additionally or alternatively, the search query may also automatically be initiated by the client device 101 without interaction of the user, e.g., via an interface between an application stored on the client device 101 and the search engine 103. Alternatively, the search query may also be sent to the search engine 103 via the server 102.

The server 102 may be a single server but may also be a distributed server environment comprising a plurality of servers that are handling search queries. In such a distributed server environment, one server 102 receives the search queries and may distribute them to other servers 102 for further processing. The servers 102 may also have access to one or more databases 112 that may store additional information relating to the client devices 101 or to the users of the client devices 101, and may store one or more models for selecting actions in order to feed the search engines. A plurality of applications may be executed on the server 102 to execute the method described herein as well as to execute several other tasks (not described).

The server 102 may comprise at least one dedicated high-performance computing system that is specifically designed for training of machine-learning models. The dedicated high-performance computing system may also not be part of the server 102 but located in a remote location and independent of the server 102, e.g., such as a cloud high-performance computing system.

The databases 112 may comprise volatile and non-volatile memory, multi-level cell flash memory, triple level cell flash memory, and/or cloud storage or backup systems. It should further be appreciated that the databases 112 described herein may be a combination of multiple storage resources, including but not limited to those referenced herein. The databases 112 may further include different storage technologies and may be situated at different locations. The databases 112 may be comprised by the server 102.

The client device 101 may send, directly or via server 102, search parameters indicated by the search query to one or more search engines 103. The search engine 103 may be a meta-search engine that has access to a plurality of search result providers 104 or may be a search engine 103 of one search result provider 104, that has access to the one search result provider 104. In such an embodiment, the search result provider 104 and the search engine 103 may form one computing system or environment. If the search parameters are sent to one search engine 103, the search engine 103 is typically a meta-search engine that then requests data according to the search parameters from the one or more search result providers 104. Additionally or alternatively, the search engine(s) 103 may have access to a plurality of databases 113, which may or may not form part of one common environment with the respective search engine 103.

The databases 113 may comprise volatile and non-volatile memory, multi-level cell flash memory, triple level cell flash memory, and/or cloud storage or backup systems. It should further be appreciated that the databases 113 described herein may be a combination of multiple storage resources, including but not limited to those referenced herein. The databases 113 may further include different storage technologies and may be situated at different locations. The databases 113 may be part of the search engine 103. The databases 113 may also be used to store or cache previous search results fetched from search result providers 104 to answer search requests, e.g., from server 102, more quickly.

The search engine(s) 103 request search results from the one or more search result providers 104. The one or more search result providers 104 may process the requests and access one or more databases 114 to gather data fulfilling requests received from the search engines. The databases 114 may comprise volatile and non-volatile memory, multi-level cell flash memory, triple level cell flash memory, and/or cloud storage or backup systems. It should further be appreciated that the databases 114 described herein may be a combination of multiple storage resources, including but not limited to those referenced herein. The databases 114 may further include different storage technologies and may be situated at different locations. The databases 114 may be comprised by the one or more search result providers 104.

Figure 2:
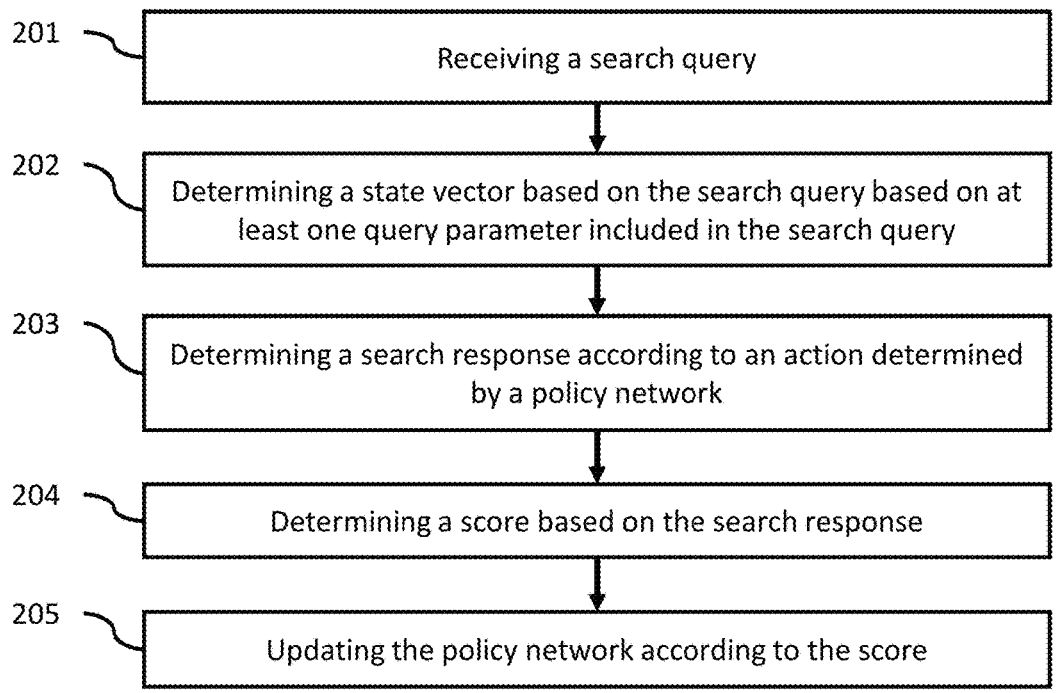
FIG. 2 is a basic flowchart of processing a search query.

A more detailed view on the processes as described is presented in the flowchart of FIG. 2. The basic method, e.g., executed at least in part on the client 101 of FIG. 1, starts with receiving a search query in box 201. Such a search query may be any search query for which search results may be requested, e.g., when a user searches for items, such as a product or an event, or when a device requires information, such as available connections to servers, available data streams, or the like. For example, a user of the client device 101 may search for a journey, a hotel, an event ticket, a downloadable app, or the like. Via a user interface of an application executed on the client device, the search query may be entered at the client device 101 and received by the client device 101. Alternatively, the search query may be received by an application from software of the application itself, e.g., automatic search query when booting for a connection to a network or the like.

Next, as shown in box 202, a state vector based on at least one query parameter included in the search query is determined. The state vector generally represents a current state of processing the search query, hence, at the beginning after receiving the search query, the state vector is determined based on at least one search parameter included in the search query. In some embodiments, all search parameters of the search query are taken into account when generating a state vector or, in other embodiments, only some search parameters are considered.

A state vector may have a reduced dimensionality in comparison with, for example, one-hot encoding. As will be apparent to those skilled in the art, one-hot encoding categorical data of a search query may require vectors with many thousands of dimensions or more, rendering processing of such vectors intractable. Therefore, encoding parameters of the search query may maintain statistical qualities of the input data, whereas one-hot encoding fails to preserve such qualities.

For example, if the search query comprises values A (e.g., the date 12 Mar. 2023), B (e.g., the departure location Nice airport, NCE), and C (e.g., the destination location Amsterdam city, AMS city), the corresponding state vector may be a numerical representation of the values A, B, and C. A may be transformed to 20230312, B may be transformed, e.g., hashed, and may correspond to 987654321, and C may be transformed, e.g., hashed or tokenized, and may correspond to 123456789. The state vector may then comprise the numerical values of A, B, and C. The state vector may further be defined to have a pre-defined length. Missing parameters, e.g., because they have not been provided or do not reflect the current state of the search processing, are replaced with zeros or not a number (NaN) or the like.

Figure 3:
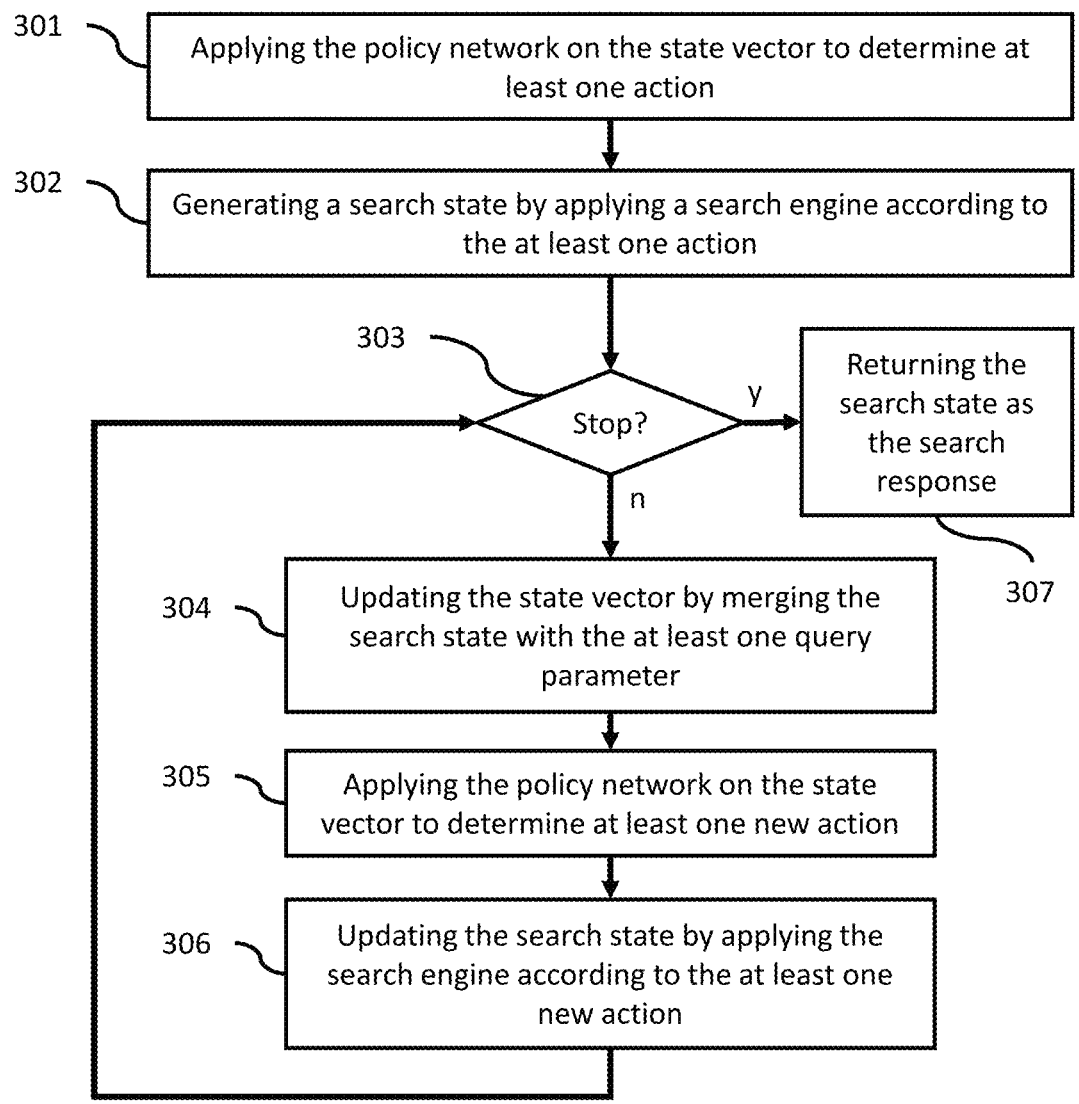
FIG. 3 is a flowchart of determining the search response according to an embodiment.

After having determined the state vector for the first time, a search response is determined in box 203. This process may be comprehensive and encompass multiple iterations, e.g., such as depicted in FIG. 3. The search response is determined according to at least one action determined by a policy network. In reinforcement learning, policy networks determine actions for agents. Here, the agent is the search engine 103 and the action may comprise at least one of selecting at least one query parameter as input for the search engine 103, tailoring the search of the search engine 103 to specific products and/or services, adding at least one query parameter as input for the search engine 103, and adding a vectorization of the search query as input for the search engine 103.

For example, if the action selects only parameters A and B as input for the search query, a search query sent to the search engine 103 will then be based on A and B (not C). If the action tailors the search to specific products and/or services, the search engine 103 may be instructed to only query particular providers 104. If the action adds parameter D to the search query (e.g., a specific departure time), the query sent to the search engine 103 also comprises and the search is also focused on parameter D. Additionally, the action may also add/generate a vectorization of the search query, i.e., not transmitting the parameters in explicit single form, for input for the search engine 103.

Actions generally impact an amount of resources to be utilized for determining the search response. For example, actions that limit the search queries, e.g., to only query specific databases, reduce the computational resources needed to determine the search response. As another example, a number of actions performed by the methods described herein may directly correspond a number of search queries processed by a search engine. Therefore, the actions impact the processes and, thus, the resources needed to determine the search response.

When the search response has been determined, a score based on the search response is determined in box 204. The score defines a reward given for the search response. The score may be determined based on various metrics. For example, the score may be determined based on a maximum response time of determining the at least one search response—the longer it took to determine the search response and/or if the processor consumption exceeds a threshold, the lower the score becomes. The score may be determined based on a processor consumption of determining the at least one search response—the more processor consumption is needed and/or if the processor consumption exceeds a threshold, the lower the score becomes. The score may be determined based on a number of search results comprised by the search response—the more search results provided, the less search results provided, or if the number of search results is between two thresholds, the higher the score becomes. The score may be determined based on a user interaction with the search response—if a user clicks on a search result in the search response, finally selects a search result in the search response, or the like (such as depending on conversion or click-through rate of the user), the higher the score becomes. Combinations of such factors can be used, too.

The score generally represents the quality of the response to the search query and can be adapted for a client device 101 and/or for a user of the client device 101 to fit a given communication interface, machine-learning model interface, compatibility, use case, and the like. The score may be an absolute value which may be compared to other scores. The score may alternatively also be a relative score. The score may embed one or more metrics in one single number. If more than one metric is considered, the score may be a weighted sum of all metrics. The metrics and or score may in some examples be normalized to, e.g., values between 0 and 1, or to a number of integer values, e.g., values $\{-1; 0; 1\}$.

In some embodiments, a specific user or a specific client device 101 is associated with an identifier, which may also be the same for a group of client devices 101 or users, and the score or the metrics comprised by the score may be adapted to the specific needs. Moreover, the state vector may then also comprise the identifier or any representation of it (e.g., hashed version) in order to tailor the reinforcement learning with the policy network to the specific requirements (e.g., response time, use of computational resources etc.). For example, a user may be a travel agency specialized in eco-friendly travel in Europe. Their clients may be more likely to prefer trains and short haul flights on the continent. The method described herein is e.g. adapted to learn to associate this travel agency with corresponding search queries and direct the search to more eco-friendly travel routes.

The score is then used to update the policy network in box 205. In some embodiments, the score is used to determine an update gradient for the policy network. Additionally, the score may also be used to determine an update gradient for a value network of a larger reinforcement learning neural network, of which also the policy network forms a part.

Generally, the neural network may be an actor-critic model as described, e.g., in Mnih, Volodymyr, et al. "Asynchronous methods for deep reinforcement learning.", International conference on machine learning, PMLR, 2016 or in Sutton, Richard S., and Andrew G. Barto, Reinforcement learning: An introduction, MIT press, 2018. In some embodiments, the neural network is a A3C model (asynchronous advantage actor-critic model), which is able to handle continuous and discrete actions. It can be adapted to a non-GPU environment and provides good performances on classic CPUs. Therefore, the herein described methodologies can be deployed on any devices, e.g., servers, personal computers, smart phones, and other smart devices. The actor-critic model also allows distributed computations with advantages of federated learning, such as privacy, distributed workload, and low latency.

FIG. 3 describes in more details how the reinforcement learning method determines in combination with the search engine 103 the search response. After receiving the search query and determining the first state vector based on the search parameters of the search query (as shown in boxes 201 and 202 in FIG. 2), the policy network is applied on the state vector to determine at least one first action. This is depicted in box 301.

A search state may then be determined by executing a search engine according to the at least one action, which is shown in box 302. In reinforcement learning, policy networks determine actions for agents. The action may comprise at least one of selecting at least one query parameter as input for the search engine 103, tailoring the search of the search engine to specific products and/or services, adding at least one query parameter as input for the search engine 103, and adding a vectorization of the search query as input for the search engine 103. The search state comprises the search results retrieved from the search engine 103.

The processes of boxes 304, 305, and 306 are then executed as long as a stopping condition is not reached, which is depicted with box 303. The stopping condition may comprise that a maximum number of repetitions is reached. For example, if determining a search state is to be done twice at maximum, the stopping condition may be one repetition, i.e., that the processes of boxes 304 to 306 are only executed once. The stopping condition may also comprise that a maximum time for generating the search response is reached. For example, a time threshold may be set and the loop will be stopped when the maximum time is exceeded. The stopping condition may also comprise that a number of search results exceeds or falls below a threshold. For example, if the number of search results is first large following the first action, the number of search results may be reduced with the next actions in order to have a more limited number of search results in the search response.

When the search state has been determined and the stopping condition was not reached, the state vector is updated by merging the search state with the at least one query parameter in box 304. Merging may comprise determining a plurality of parameters from the search state that reflect the state of the search. These parameters may comprise the number of search results obtained, time needed to prepare the search results, the provider servers 104 queried, the search parameters provided to the search engine 103, one or more mean characteristics of the search results, such as a mean price, a mean number of nodes needed for setting up a connection or the like, and/or further parameters related to the state of the search. Then, at least some of these parameters are appended to the search parameters already comprised in the initial state vector. The number of entries in the initial state vector may be pre-determined. Missing parameters, e.g., because they have not been provided or are not reflecting the current state of the search, are replaced with zeros or not a number (NaN) or the like.

Afterwards as shown in box 305, the policy network is applied on the new updated state vector. As previously, the policy network then determines one action, which then influences how the search engine 103 is executed to generate a new search state. This is depicted in box 306. The process then loops to checking the stopping condition of box 303. If the stopping condition is reached, the process returns in box 307 at least part of the search state, e.g., at least some search results, possibly in combination with other search results from earlier searched, as the search response. If the stopping condition is not met, the processes of boxes 304 to 306 are repeated. Hence, for determining the search response, there can be several successive states of processing and therefore several different state vectors (e.g., one per step in the overall process).

It should further be noted that the algorithmic implementation of the process of FIG. 3 can also be different. For example, the first determination of an action and execution of the search engine 103 as depicted with boxes 301 and 302 can also be part of the loop, with a modified stopping condition.

Figure 4:
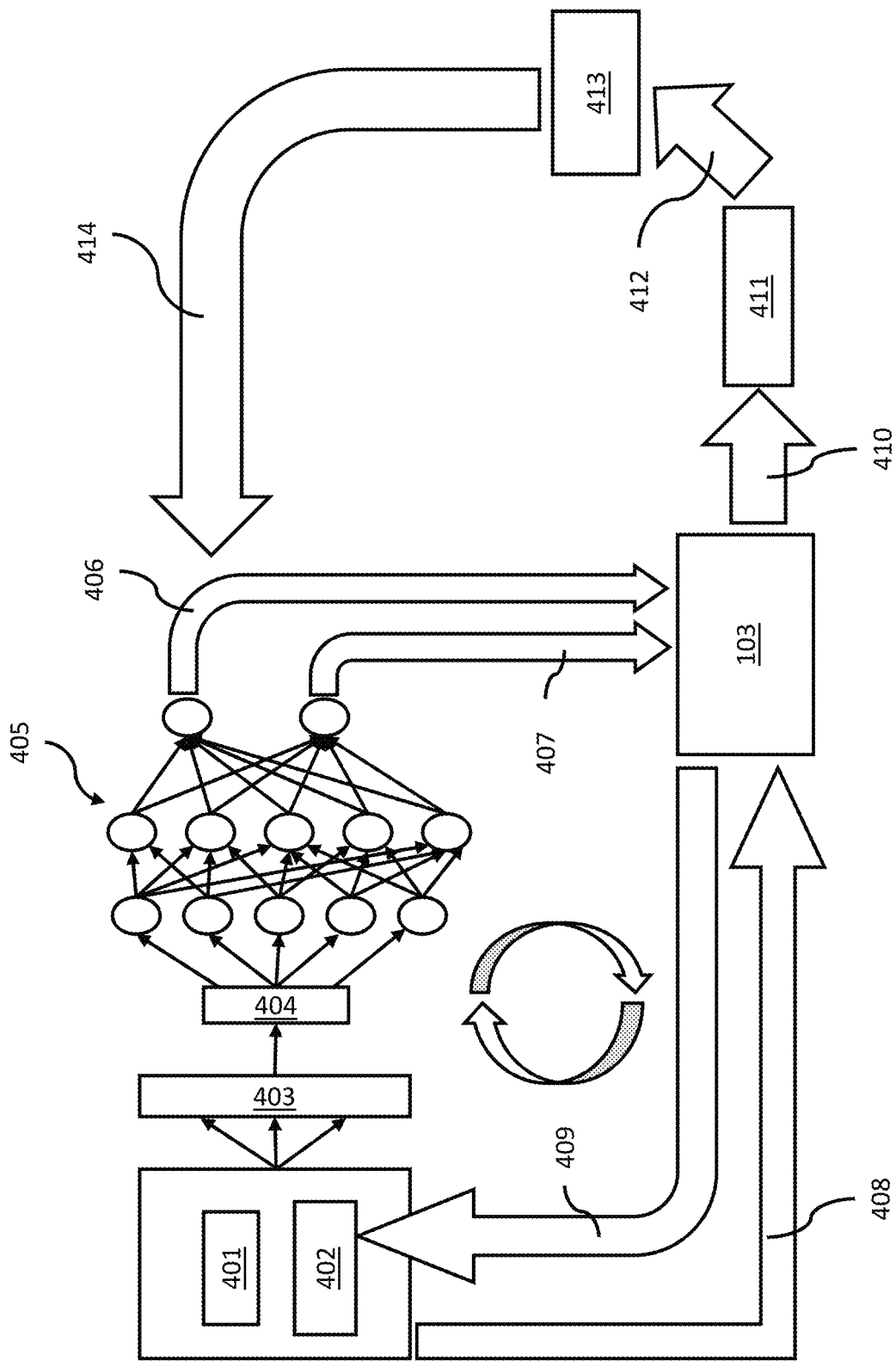
FIG. 4 presents a detailed overview on processing a search query according to an embodiment.

FIG. 4 presents a detailed overview of an example of processing a search query. In this example, the search query 401 is received, e.g., from a user via a user interface, at the client device 101. The search state 402 is—at the beginning—not set, e.g., comprising a vector of zeros. The search parameters of the search query 401 are merged, appended, and/or otherwise pre-processed, which may comprise hashing, tokenization or padding processes, with parameters extracted from the search state 402 in box 403. The result is a state vector 404, which serves as input to a neural network 405. The neural network 405 comprises a policy network and may also comprise a value network. The policy network determines one or more actions 406 and 407 that are used to modify the search performed by the search engine 103.

As depicted with arrow 408, the search engine 103 may receive the search parameters 401 and/or the previous search state 402 without modification and may receive the actions 406, 407 separately. Alternatively, the search parameters 401 and/or the previous search state 402 may be transmitted along with the actions 406, 407 and may also be modified by the actions 406, 407 before transmission to the search engine 103.

The search engine 103 processes the received search request according to the search parameters 401 and/or the previous search state 402 as well as the actions 406, 407 and produces a new search state 409, which updates the search state 402. Then, the loop on the left-hand side of FIG. 4 is repeated until a stopping condition is reached. The last search state, in particular, the last search results of the last search, which may be in some embodiments merged with search results of earlier searches, are then returned by arrow 410 as search response 411.

The search response is evaluated as depicted by arrow 412 and a score 413 is determined. Based on the score 413, the neural network 405 is updated, e.g., the update gradient of the neural network 405 is determined based on the score 413, which finally is shown by arrow 414. In some embodiments, all the processes of FIG. 4 except of determining search results by the search engine 103 are executed at the client device 101. Alternatively, the client device 101 does not directly update the neural network 405 but sends the determined update gradient to the server 102, from which the client device 101 then receives an updated form of the neural network 405.

Figure 5:
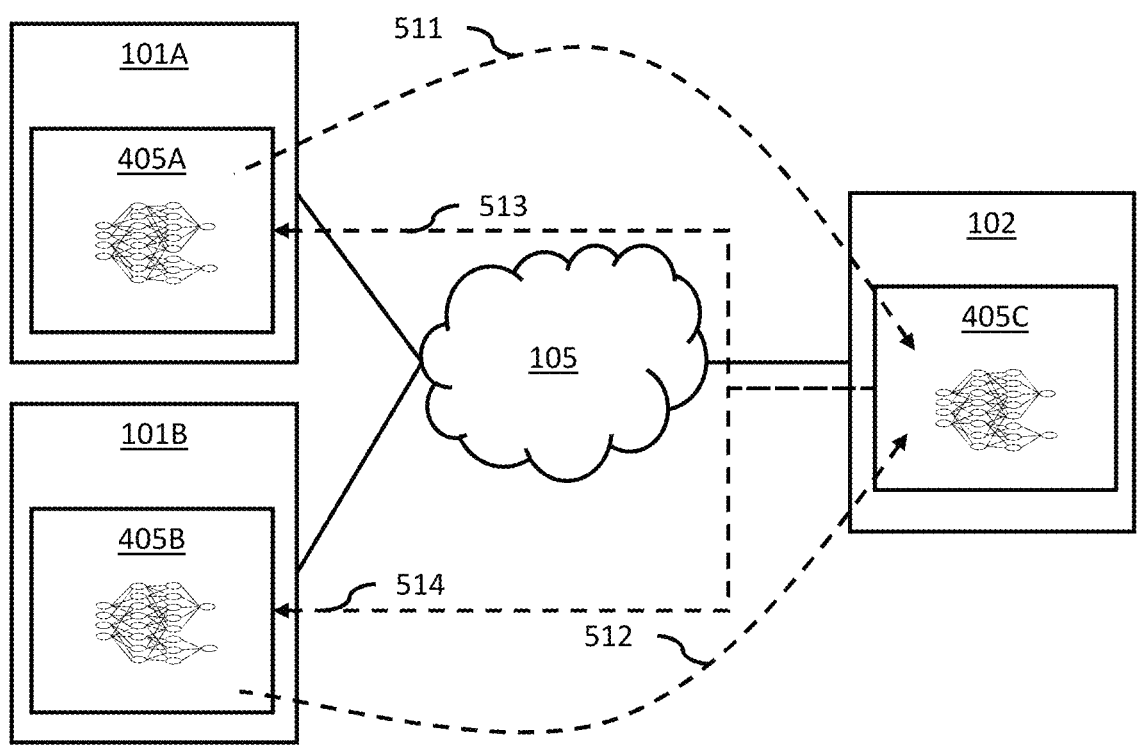
FIG. 5 shows an example of an asynchronous update of neural networks employed in the processing of the search query according to embodiments.

Such an embodiment of updating the neural network 405 via the server 102 is shown in FIG. 5. Client device 101A stores a neural network model 405A and client device 101B stores a neural network model 405B. The server 102, which is connected to the client devices 101A and 101B via the network 105, also stores a master model 405C of the neural network models 405A and 405B. The neural network models 405A and 405B may be the same but may also differ as one of them may have been updated recently while the other has not.

After one or more iterations of determining a search response 411 as described herein, the client device 101A determines an update gradient for the policy and the value network comprised by the neural network 405A according to a plurality of scores 413 of several iterations. Depicted with arrow 511, the update gradient is transmitted to server 102. In a distributed network, other client devices 101, such as the client device 101B, also determine update gradients similarly and transmit the update gradients to the server 102, which is shown for the client device 101B by the arrow 512.

The update gradient may be transmitted to the server 102 after having determined a respective score 413 based on a generated search response at the client device 101. Alternatively, the update gradient may be transmitted to the server 102 at specified time intervals, e.g., every second, hour, or day. and/or after a given number of determined search responses. The updated gradient may then be an accumulated gradient learned from the determined search responses and/or during the specified time intervals.

At the server 102, the master model 405C is then updated according to one or more received update gradients. Thereafter, the master model 405C is transmitted to the client devices 101A and 101B as shown by arrows 513 and 514. The updated policy network (and/or the updated value network) may be received from the server 102—and the locally stored neural networks 405A and 405B may then be updated by the updated policy network—at specified time-intervals or directly after having transmitted the score 413 to the server 102.

Client devices 101 such as the client device 101A and the client device 101B may also be computing machines in a massively parallel architecture of a computing farm and search queries of users may be distributed among the client devices 101 for processing. All client devices 101 asynchronously update the master model 405C, which is shared by all instances. For example, the neural networks 405A and 405B may be updated before the next iteration of processing a search query is initiated, hence, bringing the neural networks 405A and 405B in line with the current version of the master model 405C. In such an example, the neural networks 405A and 406B allow random selections of actions (at least to a small extent) to explore paths.

Self-optimizing systems as the one described herein can potentially be prone to diverge if there is an unexpected event (e.g., polluted data or a glitch in the code). To prevent such a situation, the score may be defined with care. Training and monitoring the neural networks 405. 405A, 405B, or the master model 405C in a separated environment may be beneficial and reducing randomness of those in application. Furthermore, the type and number of actions may be restricted by setting boundaries for a reasonable action space.

Figure 6:
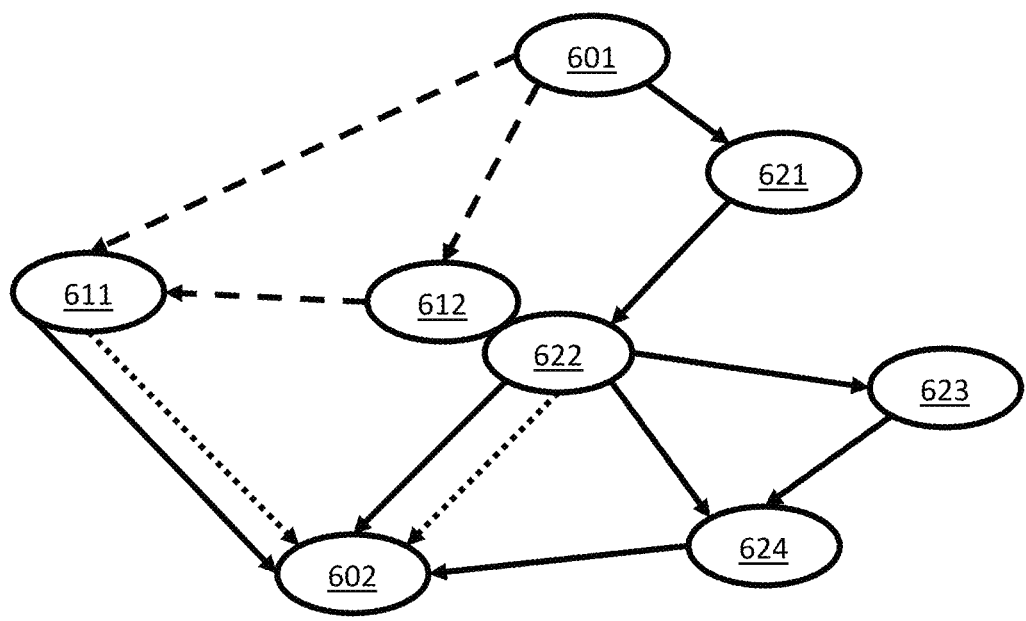
FIG. 6 shows an example of directing a search engine with actions.

Now turning to FIG. 6, which shows an example of directing a search engine 103 with actions. For example, ellipse 601 may be the departure location of a journey to be searched, e.g., Nice airport, and ellipse 602 may be the arrival location, e.g., Amsterdam city center. The other ellipses may represent further stops via the journey. If a respective search query is sent to the search engine 103 without any actions, the search engine 103 may return and query every path possible. With the herein presented self-optimizing reinforcement learning search, search queries will be directed to the search engine 103 in a more specific way and thus enable the search engine 103 to process the search query more efficiently.

For example, assume that 611 is Amsterdam airport, 612 is Paris airport, 621 is Nice train station, 622 is Paris train station, 623 is Brussels train station, and 624 is Antwerp train station. Dashed lines then refer to flights, dotted lines to bus travel, and solid lines to train routes. Other routing options may be considered, too.

In this example, a user may be a travel agency specialized in eco-friendly travel in Europe. Their clients may be more likely to prefer trains and short haul flights on the continent. Hence, the flight options may not be the preferred and the search engine 103 may be directed by an action to exclude the flight options or preferably present those flight options with direct flights, e.g., the option 601 to 611 and 612.

Moreover, another action may direct the search engine 103 to search for different transports from Amsterdam airport 611 to Amsterdam city center 602, but exclude taxi and car and prefer bus and train. The search engine 103 may also be directed to specifically search for train connections, e.g., via 621, 622, 623, and/or 624. Hence, the present invention can reduce the search queries the search engine has to send out and tailor the search specifically to learned preferences of a client device or user.

Generally speaking, the herein presented methods reduce the computational resources needed to process data for providing search responses as the searches are directed via actions. It therewith achieves lower response times and an improved quality of the results as they are tailored to, e.g., user or client groups. Due to the use of neural networks 405 and reinforcement learning, a tailored optimization, even on a client or user level is possible. No human intervention is needed, which allows the optimization of very complex systems, i.e., search queries having a very large search space, e.g., handling many different parameters. The methods presented herein allow an automatic reaction to sudden change in the data as the master model 405C may be trained continuously. Therefore, there is also no need for massive data storage to train the master model 405C as an asynchronous update scheme from all distributed client devices 101 is used. The master model 405C may replace many different models and reduce the intelligence needed at the search engine 103.

Figure 7:
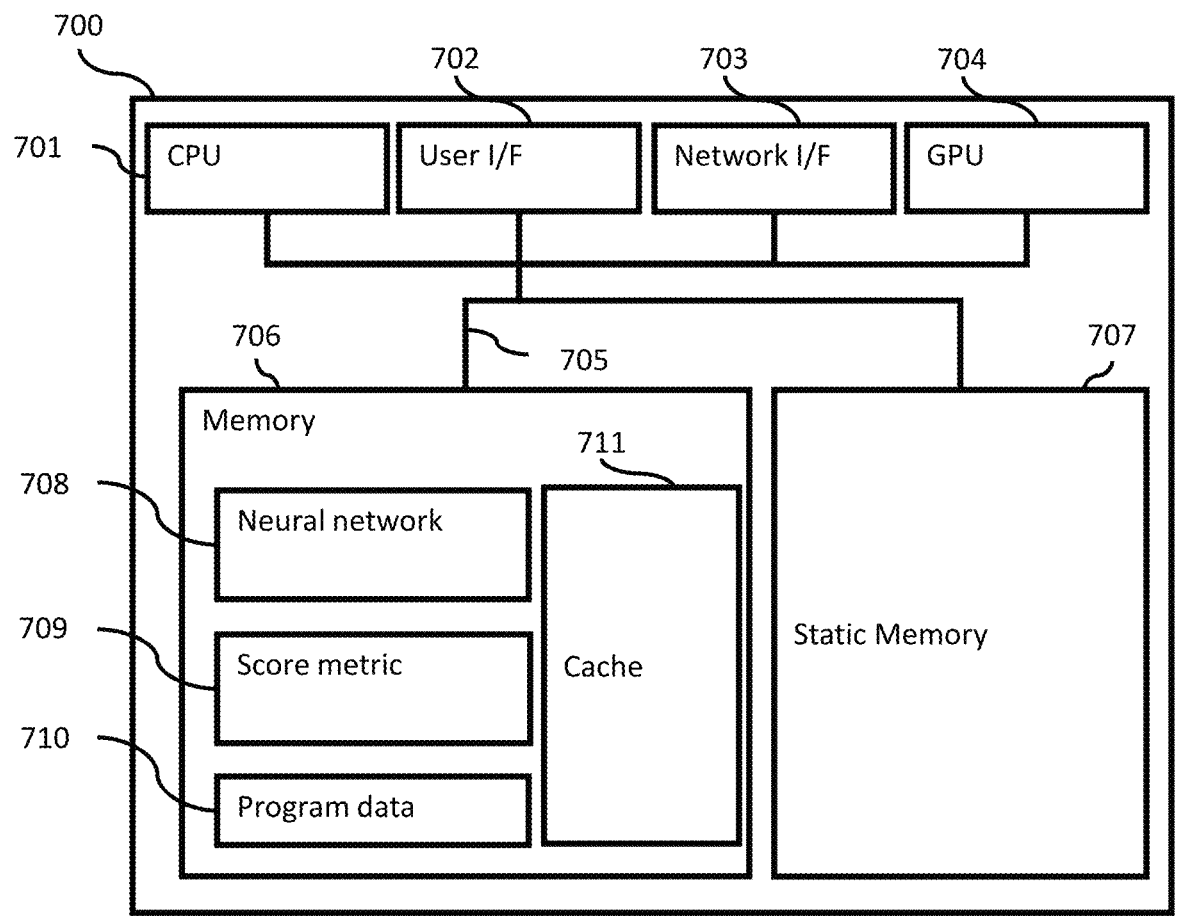
FIG. 7 is diagrammatic representation of a computing system implementing the functionalities described herein.

FIG. 7 is a diagrammatic representation of internal components of a computing system 700 implementing the functionality as described herein. The computing system 700 includes at least one processor 701, a user interface 702, a network interface 703 and a main memory 706, that communicate with each other via a bus 705. Optionally, the computing system 700 may further include a static memory 707 and a disk-drive unit (not shown) that also communicate with each via the bus 705. A video display, an alpha-numeric input device and a cursor control device may be provided as examples of user interface 702. Furthermore, the computing system 700 may also comprise one or more graphics processing units (GPU) 704.

The GPUs 704 may also comprise a plurality of GPU cores or streaming multiprocessors, which comprise many different components, such as at least one register, at least one cache and/or shared memory, and a plurality of ALUs, FPUs, tensor processing unit (TPU) or tensor cores, and/or other optional processing units.

The main memory 706 may be a random-access memory (RAM) and/or any further volatile memory. The main memory 706 may store program code for a neural network module 708 and, e.g., a score metric module 709. Other modules needed for further functionalities described herein may be stored in the memory 706, too. The memory 706 may also store additional program data 710 required for providing the functionalities described herein. Part of the program data 710, the score metric module 709 and/or neural network module 708 may also be stored in a separate, e.g., cloud memory and executed at least in part remotely.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the disclosure. Moreover, any of the flowcharts, sequence diagrams, and/or block diagrams may include more or fewer blocks than those illustrated consistent with embodiments of the disclosure.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated the method and while these embodiments have been described in considerable detail, it is not the intention of the applicants to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The invention claimed is:

1. A method of processing a search query using reinforcement learning, the method being implemented at a computing device, the computing device storing a copy of a neural network comprising a policy network and a value network wherein a master model of the neural network is stored on a central server, and the method comprising:
   a receiving a search query;
   determining a state vector representing a current state of processing the search query based on at least one query parameter included in the search query;
   determining a search response to the search query according to at least one action determined by a policy network based on the state vector, the at least one action impacting an amount of resources to be utilized for determining the search response;
   determining a score based on the search response, the score defining a reward given for the search response; and
   updating the policy network according to the score;
   wherein determining the search response comprises:
   applying the policy network on the state vector to determine the at least one action; the at least one action including at least one of:
   selecting at least one query me ter as input for the search engine;
   tailoring the search of the sear engine to specific products and/or services;
   adding at least one query parameter as input for the search engine; and,
   adding a vectorization of the search query as input for the search engine;
   generating a search state by applying a search engine according to the at least one action;
   as long as a stopping condition is not fulfilled:
   i. updating the state vector by merging the search state with the at least one query parameter;
   ii. applying the policy network on the state vector to determine at least one new action;
   iii. updating the search state by applying the search engine according to the at least one new action; and
   returning at least part of the search state as the search response;

wherein the stopping condition comprises at least one of:
a maximum number of repetitions is reached;
a maximum time for generating the search response is reached; and
a number of search results exceeds or falls below a threshold.

2. The method of claim 1, wherein a quality metric to determine the score is individually computed for or chosen at a client providing the search query.

3. The method of claim 2, wherein the state vector comprises an identification of the client.

4. A method of processing a search query using reinforcement learning, the method being implemented at a computing device, the computing device storing a copy of a neural network comprising a policy network and a value network wherein a master model of the neural network is stored on a central server, the method comprising:
receiving a search query;
determining a state vector representing a current state of processing the search query based on at least one query parameter included in the search query;
determining a search response to the search query according to at least one action determined by a policy network based on the state vector, the at least one action impacting an amount of resources to be utilized for determining the search response;
determining a score based on the search response, the score defining a reward given for the search response; and
updating the policy network according to the score;
wherein the policy network forms a part of a neural network stored at a computing device, wherein the neural network further comprises a value network, wherein a master model of the neural network is stored on a server, wherein updating the policy network according to the score comprises:
a. determining an update gradient for the policy network and the value network according to the score;
b. transmitting the update gradient to the server, wherein the master model of the neural network is updated at the server according to the update gradient;
c. receiving the updated neural network from the server; and
d. updating the policy network and the value network by the updated neural network received from the server.

5. The method of claim 4, wherein the update gradient is transmitted to the server after having determined a respective score based on the search response.

6. The method of claim 4, wherein the update gradient is transmitted to the server at specified time intervals and/or after a given number of determined search responses, wherein the updated gradient is an accumulated gradient learned from the determined search responses and/or during the specified time intervals.

7. The method of claim 4, wherein the updated policy network is received from the server and the policy network is updated by the updated policy network after having transmitted the score to the server and/or at specified time-intervals.

8. A computing device for processing a search query, the computing device storing a copy of a neural network comprising a policy network and a value network wherein a master model of the neural network is stored on a central server, the computing device using reinforcement learning and being configured to:
receive a search query;
determine a state vector representing a current state of processing the search query based on at least one query parameter included in the search query;
determine a search response to the search query according to at least one action determined by a policy network based on the state vector, the at least one action impacting an amount of resources to be utilized for determining the search response;
determine a score based on the search response, the score defining a reward given for the search response; and
update the policy network according to the score;
wherein determining the search response comprises:
applying the policy network on the state vector to determine the at least one action; the at least one action including at least one of:
selecting at least one query parameter as input for the search engine; tailoring the search of the search engine to specific products and/or services;
adding at least one query parameter as input for the search engine; and, adding a vectorization of the search query as input for the search engine;
generating a search state by applying a search engine according to the at least one action;
as long as a stopping condition is not fulfilled;
i. updating the state vector by merging the search state with the at least one query parameter;
ii. applying the policy network on the state vector to determine at least one new action;
iii. updating the search state by applying the search engine according to the at least one new action; and
returning at least part of the search state as the search response,
wherein the stopping condition comprises at least one of:
a maximum number of repetitions is reached;
a maximum time for generating the search response is reached; and
a number of search results exceeds or falls below a threshold.

9. A computing system for processing a search query with reinforcement learning comprising:
a central server storing a master model of a neural network comprising a policy network and a value network; and
at least two computing devices storing each a copy of the neural network;
wherein the at least two computing devices execute the method according to claim 1 independently; and wherein the copies of the policy network and the value network are updated asynchronously by the central server based on scores and gradients determined at the at least two computing devices.

10. A computer program product comprising program code instructions stored on at least one computer readable medium to execute the method steps according to claim 1, when said program code instructions are executed on a computer.

* * * * *